United States Patent
Minkkinen et al.

(10) Patent No.: US 6,505,683 B2
(45) Date of Patent: Jan. 14, 2003

(54) PROCESS FOR PURIFICATION BY COMBINATION OF AN EFFLUENT THAT CONTAINS CARBON DIOXIDE AND HYDROCARBONS

(75) Inventors: Ari Minkkinen, Saint Nom la Breteche (FR); Alexandre Rojey, Rueil Malmaison (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 0 days.

(21) Appl. No.: 09/843,645

(22) Filed: Apr. 27, 2001

(65) Prior Publication Data

US 2002/0036086 A1 Mar. 28, 2002

(30) Foreign Application Priority Data

Apr. 27, 2000 (FR) .............................. 00 05425

(51) Int. Cl.$^7$ .............................................. E21B 43/40
(52) U.S. Cl. .................... 166/266; 166/267; 166/302
(58) Field of Search ........................ 166/75.12, 266, 166/267, 268, 272.1, 302, 404

(56) References Cited

U.S. PATENT DOCUMENTS

| | | | | |
|---|---|---|---|---|
| 1,978,655 A | * | 10/1934 | Straight ....................... | 166/266 |
| 2,729,291 A | * | 1/1956 | Haverfield .................. | 166/266 |
| 3,065,790 A | | 11/1962 | Holm | |
| 3,150,716 A | | 9/1964 | Strelzoff et al. | |
| 3,193,006 A | * | 7/1965 | Lewis ......................... | 166/266 |
| 3,232,885 A | * | 2/1966 | Henke ......................... | 166/268 |
| 3,480,082 A | * | 11/1969 | Gilliland ..................... | 166/266 |
| 3,845,196 A | * | 10/1974 | Rhoades ...................... | 166/257 |
| 4,333,529 A | | 6/1982 | McCorquodale ............ | 166/267 |
| 4,344,486 A | | 8/1982 | Parrish | |
| 4,382,912 A | * | 5/1983 | Madgavkar et al. ......... | 166/266 |
| 4,654,062 A | * | 3/1987 | Gottier ........................ | 166/268 |
| 4,765,407 A | * | 8/1988 | Yuvancic ..................... | 166/266 |
| 5,109,928 A | * | 5/1992 | McCants ..................... | 166/266 |
| 5,520,249 A | * | 5/1996 | Minkkinen et al. ......... | 166/266 |
| 5,769,165 A | * | 6/1998 | Bross et al. ................. | 166/263 |

* cited by examiner

Primary Examiner—George Suchfield
(74) Attorney, Agent, or Firm—Millen, White, Zelano & Branigan, P.C.

(57) ABSTRACT

For the purification of an effluent that contains carbon dioxide and hydrocarbons resulting from a carbon dioxide-assisted recovery stage, the effluent is circulated in a gas-liquid separator (3) to recover $C_3^+$ liquid and a gas that contains carbon dioxide and, for example, less than 10% of methane and ethane. Pressurized combustion (13) of the gas with air produced a combustion gas (21) enriched with carbon dioxide and water vapor. The combustion gas (21) is cooled (11) (22) to recover heat, and the cooled combustion gas is recycled under pressure by a compressor (27) to an injection well (29). Nitrogen is at least partly separated from the combustion gas before the recycling, and in an optional intermediate step the condensed water is also separated from the carbon dioxide. The invention has a particular application for the assisted recovery of petroleum by $CO_2$ with a reduction of the greenhouse effect.

11 Claims, 1 Drawing Sheet

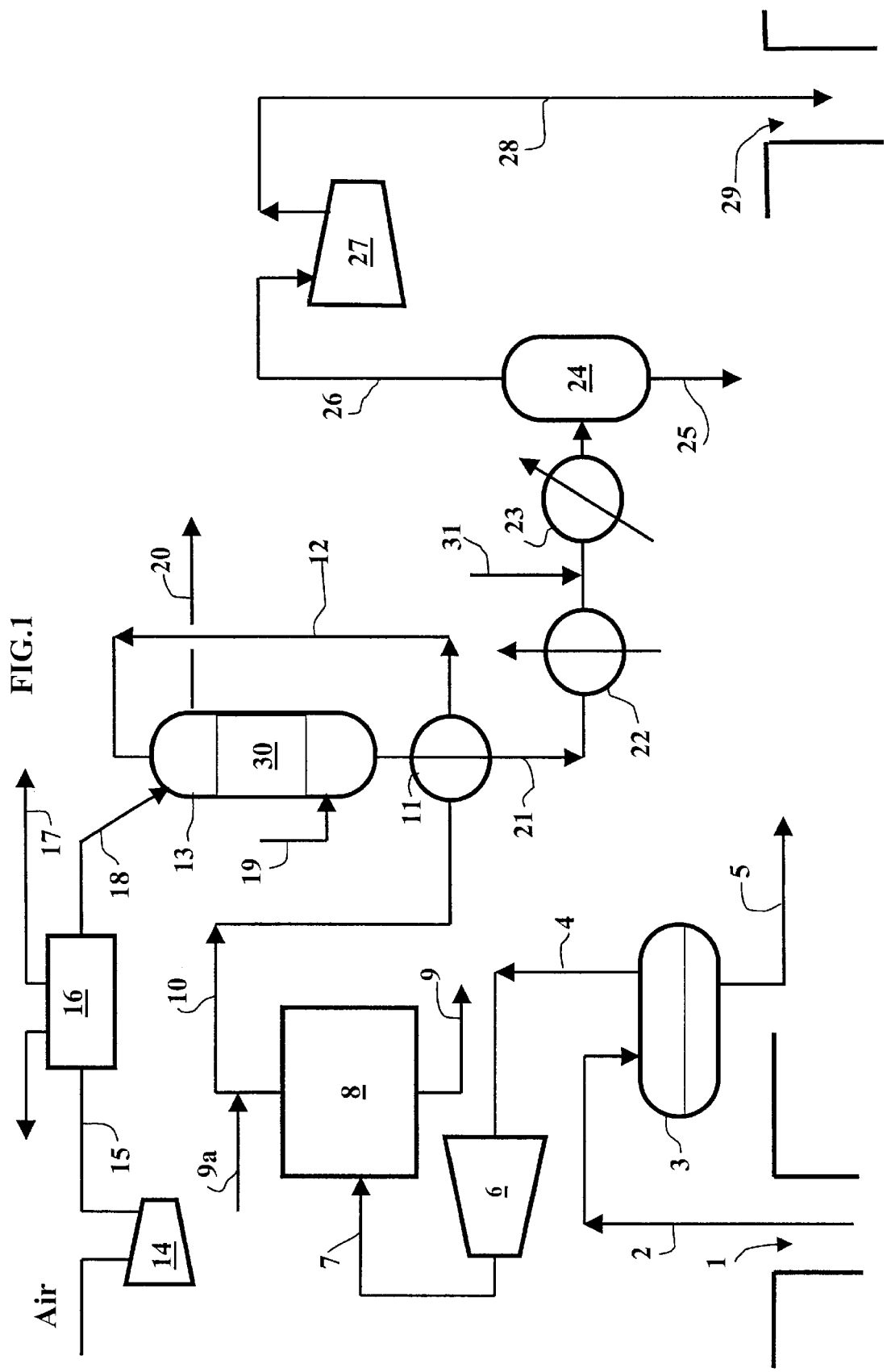

PROCESS FOR PURIFICATION BY COMBINATION OF AN EFFLUENT THAT CONTAINS CARBON DIOXIDE AND HYDROCARBONS

The invention relates to a process for purification of a feedstock that contains carbon dioxide and gaseous and liquid hydrocarbons that are recovered from at least one production well operating with an injection of carbon dioxide.

The technological background is illustrated by U.S. Pat. Nos. 4,333,529, 3,065,790 and 3,150,716.

The assisted recovery of petroleum is commonly used in the petroleum industry to recover crude oil that remains in place in a formation after its natural or forced production or to recover heavy fuel that is too viscous to flow naturally or artificially using unsophisticated pumping means.

To date, steam is the driving force that is most commonly used to flush crude oil formations effectively, but production programs are increasingly implementing an injection of carbon dioxide ($CO_2$), even nitrogen, to produce petroleum.

Thus, in the next few years, carbon dioxide may prove to be a particularly advantageous gas, to the extent that it can be used by the producers for the assisted recovery of petroleum.

The technique for assisted recovery of petroleum by flushing with carbon dioxide ($CO_2$) that is introduced into an injection well proves effective for reducing the viscosity of the petroleum in place and for increasing its mobility, which facilitates its recovery. Thus, a portion of the injected carbon dioxide is dissolved in the crude oil solution and can therefore be recovered with the petroleum during its production to be recycled later. A non-negligible portion of $CO_2$ is sequestered in the formation, however. This phenomenon of $CO_2$ sequestration thus participates in the reduction of $CO_2$ emissions in the atmosphere that are responsible for the greenhouse effect and the heating of the planet.

For the producer, this advantage is rather a drawback since a portion of the injected $CO_2$ is irretrievably lost. It therefore proves necessary to compensate for the losses of $CO_2$ due to its sequestration in the formation by an addition of $CO_2$, which of necessity carries a cost.

Furthermore, the $CO_2$ stream that is recovered from a production well contains hydrocarbons. This gaseous and liquid stream that is under pressure is separated in gas-liquid separators, to obtain a liquid phase $C_3^+$ hydrocarbons, and a gaseous phase containing primarily $CO_2$ and a substantial amount of impurities of methane with a little less ethane. These impurities can represent 5 to 12 mol % of the separated gaseous phase. In some cases where acidic crude oils are produced, the associated gas can also contain the hydrogen sulfide that is found in part as an impurity (several percent, for example).

Whereas one possibility would be to reinject this impure $CO_2$ stream that contains methane and ethane into the formation, such action would deleteriously affect the saturation pressure of the formation. Other possibilities would be to mix impure $CO_2$ stream with pure $CO_2$ obtained from an outside source, or with other hydrocarbons that are heavier than the impurities in such a way as to dilute it and to counterbalance the volatility of the methane, but these technical solutions are very costly.

Cryogenic distillation could also be used to extract the methane and the ethane from $CO_2$ and then the separated $CO_2$ could be recycled into the formation. This separation, however, also proves to be very expensive.

Solvents exist that can absorb $CO_2$, preferably with hydrocarbons, but these solvents would very easily absorb the hydrogen sulfide that is present, which would produce $CO_2$ that is polluted by $H_2S$.

U.S. Pat. No. 4,344,486 teaches hydrocarbons that contaminate carbon dioxide can be combusted by an oxygen-enriched gas or by essentially pure oxygen.

Nevertheless, there does not seem to exist any inexpensive separation technique that is sufficiently environmentally benign.

A first object of the invention is to separate the carbon dioxide from the hydrocarbon impurities that it contains.

A second object is to recycle this essentially pure carbon dioxide in an injection well so as to implement a process for assisted recovery of petroleum that is contained in a formation.

A third object is to carry out a combustion of these impurities and to recover the combustion heat.

Another object is to recover the combustion effluents so as to recycle them with the purified $CO_2$ in a hydrocarbon injection well and thereby to reduce the emissions of $CO_2$ and sulfur dioxide ($SO_2$) into the atmosphere.

In a more detailed manner, the invention relates to a process for purification of a G/L two-phase effluent that contains carbon dioxide and gaseous and liquid hydrocarbons that are recovered from at least one hydrocarbon production well that is assisted by an injection of carbon dioxide ($CO_2$), in which:

a) said pressurized G/L effluent is circulated at least once in at least one main gas-liquid separator, and $C_3^+$ hydrocarbons and a gaseous effluent containing a major portion of carbon dioxide $CO_2$ and a minor portion of methane and ethane are recovered, whereby the process is characterized in that:

b) a pressurized combustion of the gaseous effluent is carried out in the presence of air in a combustion reactor, and a combustion effluent that is enriched with carbon dioxide and water vapor and that contains nitrogen is recovered, c) said combustion effluent is cooled at least once to recover the heat, d) the nitrogen is separated at least in part from the combustion effluent; and e) the pressurized, cooled combustion effluent is recycled in an injection well using recycling means.

One of the important advantages of the process is to be able to reinject, within the framework of the implementation of the process for assisted recovery of petroleum, essentially pure carbon dioxide, that from which impurities were removed plus the one that is obtained from the combustion of said impurities. The cost of the addition of $CO_2$ is thus decreased, the release of $CO_2$ and optionally $SO_2$ into the atmosphere are thus reduced by the same token, and the combustion energy of pollutants can be recovered.

According to a characteristic of the process, it is possible to control the increase in temperature of the combustion reactor due to the exothermicity of the combustion reaction by indirect heat exchange of the combustion effluent with a coolant.

According to another characteristic of the process, it is possible, after cooling stage (c), to separate the condensed water from the cooled combustion effluent in an $H_2O/CO_2$ separator.

According to a particularly advantageous first variant of the process, the oxygen-containing gas that is used as an oxygen carrier is air. It may be preferable, primarily in the presence of air, that the combustion reactor contain a catalyst when the hydrocarbons are in a very small quantity, for example less than 4%, especially as they will be diluted by nitrogen. The combustion temperature can then be lowered between 600 and 800° C., for example, and the nitrogen oxide formation can be reduced.

According to a method of this first variant, the combustion effluent that is enriched with carbon dioxide and water vapor that results from the combustion in air of the gaseous effluent of stage (a) contains the nitrogen that is separated at least in part from the carbon dioxide after cooling stage (c) and preferably after the subsequent stage for separation of the condensed water.

The separation by cryogenic distillation of the nitrogen from the combustion effluent that essentially contains $CO_2$ and $N_2$ can be carried out more easily than that of nitrogen and oxygen from the air upstream from the combustion reactor since there exists a difference of boiling points of 117° C. in the case of the $N_2$—$CO_2$ separation, whereas it is only 13° C. in the case of the $N_2$—$O_2$ separation.

According to a second variant of the process, the oxygen-containing gas can be essentially pure oxygen, for example with less than 10% impurities. The formation of nitrogen oxides is then avoided. The combustion reactor can contain a catalyst.

According to a characteristic of this variant, it is possible to separate the nitrogen that is contained in the compressed air so as to recover essentially pure oxygen in a suitable separation unit that is placed upstream from the combustion reactor.

The G/L effluent that contains carbon dioxide and hydrocarbons that are obtained from the production well can contain hydrogen sulfide. The combustion of this gas in the reactor delivers $SO_2$.

According to a first implementation, the sulfur dioxide that is produced can be recycled in the well with the carbon dioxide.

According to a second embodiment, the sulfur dioxide can be separated from the combustion effluent.

The separation stage of the water in the $H_2O/CO_2$ separator after the cooling of the combustion effluent can comprise a scrubbing stage that makes it possible to recover an effluent that contains water and $SO_2$.

This scrubbing stage can comprise, moreover, a direct heat exchange between the combustion effluent that is cooled in part, and the cold water, which contributes to its final cooling.

A portion of the condensed water that was recovered in the $H_2O/CO_2$ separator can be cooled by indirect exchange and recycled at the top of the $H_2O/CO_2$ separator to carry out the scrubbing of the effluent that contains the $SO_2$.

It is preferable to introduce the hydrocarbons and the carbon dioxide that emerge from the production well into a main gas-liquid separator. On the one hand, a first fraction that contains the $C_3^+$ liquid hydrocarbons is recovered at the bottom of said separator, and a second fraction that contains carbon dioxide and a minor portion of hydrocarbons is recovered at the top; said second fraction is compressed, and the compressed second fraction is circulated in a secondary gas-liquid separating means in such a way as to separate said gaseous effluent from the remaining $C_3^+$ hydrocarbons.

This secondary separating means can be a conventional separator or a cooling element coupled to a gas-liquid separator.

According to another modification, it may be advantageous to introduce an addition of fuel into the combustion reactor in such a way as to maintain the temperature level of the combustion reactor at an essentially constant level. The fuel may be the GPL that is obtained from the secondary separator, for example a flow that is high in carbon monoxide and/or hydrogen sulfide or a combustible gas that is obtained from another source.

The conditions of implementation of the process are generally as follows:

main combined gases/$C_3^+$ fraction separator
  pressure of 1 to 20 bar, preferably 2 to 10 bar (1 bar=$10^5$ Pa)
  temperature of 10 to 80° C. and preferably 20–40° C.
secondary $C_3^+$ gas/residual cold separator
  pressure of 5 to 20 bar
  temperature of −30 to 10° C.
optionally catalytic combustion reactor
  a) without catalyst and with oxygen, for example
    $O_2/N_2$ separator by cryogenic distillation
    pressure of 5 to 20 bar
    temperature of 500 to 1000° C.
  or
  b) with catalyst and air, for example
    pressure of 3 to 8 bar
    temperature of 450 to 800° C., preferably 500 to 600° C.
    catalyst: extrudates or ceramic balls (alumina, for example, comprising at least one noble metal (Pt, Pd) or nickel
    volumetric flow rate of 2,000 to 10,000 vol./vol./h
heat exchanger
  temperature at the inlet of the reactor of 300 to 700° C., preferably 450° C. to 600° C., for example
  $N_2/CO_2$ separator by cryogenic distillation.

BRIEF DESCRIPTION OF THE DRAWING

The invention will be better understood based on FIG. 1 that diagrammatically illustrates an economically less advantageous embodiment of the process according to which the purification of $CO_2$ is carried out by a pressurized combustion of impurities in the presence of essentially pure oxygen.

DETAILED DESCRIPTION OF THE DRAWING

According to FIG. 1, a G/L effluent 2 that comprises crude oil and is brought into production in particular by carbon dioxide injection via at least one injection well 29 in a formation (not shown in the figure) is produced under pressure from a production well 1. This hydrocarbon effluent that is combined with gases and carbon dioxide is separated in a main production separator 3 in several stages. $C_3^+$ hydrocarbons are recovered via a line 5 to be used in conventional refining operations. At the top of the separator, the gases that contain carbon dioxide, methane, ethane and the remaining $C_3^+$ hydrocarbons are collected via a line 4 and compressed by a compressor 6 to be introduced into a secondary separator 8 that can be an absorber that operates with cooled solvent or a cooled condenser. The water that is contained in the gases can be eliminated beforehand if the separator is a cooled condenser.

$C_3^+$ hydrocarbons are recovered via a line 9 while a gaseous effluent is collected at the top via a line 10, containing carbon dioxide in large part and impurities, 2 to 10% by volume, for example, in the form of methane primarily and traces of $C_2$ and $C_3$ hydrocarbons, and even residual hydrogen sulfide, if the petroleum product is acidic. This gaseous effluent is heated by indirect exchange in a heat exchanger 11, having an outlet connected to a line 12 for introducing effluent into the upper portion of a combustion reactor 13, optionally containing a fixed catalytic bed that is described in, for example, the work: Gas Purification of A. Kohl and F. Riesenteld, 4th Edition, pages 767–783.

An approximately cylindrical reactor 13 is fed at the top via a line 18 of air that is enriched with oxygen or essentially pure oxygen. An outlet line 15 of compressor 14 communicates with an $N_2/O_2$ separator 16 and the suitable pressure of the compressor provides the energy for the $N_2/O_2$ separation by self-refrigeration or membrane diffusion. In the case of a cryogenic separator, the liquid oxygen is produced at a combustion pressure after several heat exchanges, not shown. The nitrogen that contains a minor amount of oxygen is evacuated from separator 16 via a line 17.

A heat exchanger 30, with tubes for example, inside the reactor, generates the high-pressure vapor via a line 20 from a line 19 for introducing fluid and thus absorbs the combustion heat. The temperature increase due to the exothermicity of the reaction is thereby controlled at an acceptable level, and the combustion energy is recovered.

A make-up fuel, diesel fuel for example, that is obtained from the refining of hydrocarbons in line 9, can be introduced via a line 9a into reactor 13 via line 10 to maintain an approximately constant, although low level, of hydrocarbons in feed gas 10 of the reactor, for at least a portion of the life of the assisted recovery project in the oil reservoir.

A very hot combustion effluent 21 at the bottom of the reactor that essentially consists of $CO_2$ and a small amount, if this is the case, of nitrogen or oxygen, unconverted hydrocarbons and water vapor, is cooled in indirect heat exchanger 11 with the cold gas in line 10 and in other indirect heat exchangers 22 and 23 to ambient temperature. The water that is produced by the combustion is condensed in a separator 24 that is connected to outlet line 21 of the combustion effluent and recovered via a line 25 at the bottom of the separator.

When combustion gas 21 contains sulfur dioxide $SO_2$ that is obtained from the combustion of the hydrogen sulfide, it is preferable to produce a final cooling of this combustion gas by direct heat exchange with the water by injecting cold water via a line 31 upstream from separator 24, which is a column contactor filled with packing, for example Rashig rings. The mass transfer efficiency is thus increased. Furthermore, the pressure drop at the outlet of the column is reduced, which helps to conserve compression power downstream.

The flow of water for combustion and washing is evacuated at the bottom of the contactor, saturated with $CO_2$ and $SO_2$, whereby the solubility limits are those that correspond to conditions of temperature and pressure in the contactor.

The gas flow of essentially pure $CO_2$ that exits separator 24 at the top via a line 26 is compressed by a compressor 27 to a pressure level that is compatible with its reinjection via a line 28 into an injection well 29 so as to recycle it in the formation and to continue the assisted recovery program of hydrocarbons by flushing with $CO_2$.

According to a preferred variant that is not illustrated by a figure, but of which the same means are listed by the same references of FIG. 1, the oxygen carrier of combustion reactor 13 that is fed via a pressurized line 18 using compressor 14 is no longer essentially pure oxygen, but air. The combustion reactor preferably contains a combustion catalyst as described above. In this case, combustion effluent 21 that is to be cooled contains water vapor, $CO_2$, nitrogen, and small amounts of hydrocarbons that are not converted and oxygen. $SO_2$ can also be present.

The separation of the combustion water and dissolved $SO_2$ is carried out like that of FIG. 1 in a scrubbing column 24 with packing. The water that is recovered in line 25 can be partially recycled and cooled at the top of the column with an indirect heat exchanger that replaces the one that is referenced 23 in the Figure, and this water contributes to the final cooling to ambient temperature of the $CO_2/N_2$ mixture, with the addition of cold water that is fed at the top of the scrubbing column 24.

The other portion of the water that is recovered with dissolved $SO_2$ can be recycled in a water injection well using a pump.

The separation of the $CO_2/N_2$ mixture downstream from the combustion reactor can be carried out by conventional cryogenics distillation after complete dehydration, which makes it possible to recover the compressed nitrogen that essentially does not contain oxygen that can be used in another assisted recovery program. The carbon dioxide that is obtained in liquid or gaseous form can be pumped or compressed according to the case after heat exchanges in the $CO_2$ injection well to continue the assisted recovery program that is implemented. It can also be reinjected into the well with the $SO_2$ that is produced during the combustion stage.

EXAMPLE 1

Case with the nitrogen separator upstream from the combustion reactor.

100 mol/h of a sweetened $CO_2$ gas combined with 10% by volume of methane (i.e., 10 mol/h) is available at a pressure of 8 bar (1 bar=$10^5$ Pa) absolute.

The carbon dioxide is purified by eliminating the methane by combustion with oxygen (98% by volume) in such a way as to produce water and additional carbon dioxide.

By cryogenic separation from air, 95% oxygen is recovered at a pressure that is suitable for the combustion reactor.

The combustion reaction is carried out at 625° C. under 8 bar absolute, and the $CO_2$ flow (line 26) that contains water is separated at 38° C. under 7 bar absolute.

The table provides the material balance in mol/h.

| Comp. | Feed-stock (volume) | Moist air | $O_2$ | $N_2$ | Effluent | $H_2O$ | Moist $CO_2$ |
|---|---|---|---|---|---|---|---|
| lines | 10 | | 18 | 17 | 21 | 25 | 26 |
| $CO_2$ | 90.0 | | | | 100.0 | 0.5 | 99.5 |
| $SO_2$ | — | | | | — | — | — |
| $CH_4$ | 10.0 | | | | trace | | trace |
| $H_2S$ | — | | | | — | — | — |
| $N_2$ | | 78.0 | 0.4 | 77.6 | 0.4 | | 0.4 |
| $O_2$ | | 21.0 | 20.0 | 1.0 | trace | | trace |
| $H_2O$ | | 1.0 | | 1.0 | 20.0 | 19.0 | 1.0 |
| Total | 100.0 | 100.0 | 20.4 | 79.6 | 120.4 | 19.5 | 100.9 |
| Kg/hr | 4120 | 2874 | 644 | 2230 | 4764 | 382 | 4382 |

The combustion heat of the methane that is released in the reactor corresponds to 8.78 GJoule/h, which makes it possible to generate 3500 kg/h of vapor at 60 bar, for a temperature increase of 25° C. in the reactor. This amount of vapor can provide a power output of 720 kW from a steam turbine with 75% output.

Since the air compressor that is required for the $N_2/O_2$ separation requires a power output of 270 kW, an available power output of 450 kW is therefore advantageous.

Nevertheless, separation remains costly. In addition, the recovered nitrogen that contains $O_2$ cannot be enriched.

EXAMPLE 2

Preferred case with combustion in the presence of air and with the separation of nitrogen downstream from the combustion reactor.

100 mol/h of a sweetened $CO_2$ gas combined with methane (9% by volume) and 1% hydrogen sulfide are available at a pressure of 8 bar absolute. This gas is subjected to a catalytic combustion in the presence of air under the following conditions:

pressure 8 bar temperature 500° C.

catalyst: balls made of alumina ceramic material, comprising nickel volumetric flow rate: 4000 h$^{-1}$ temperature at the inlet of the reactor: 450° C.

Methane and $H_2S$ are thus eliminated, and $CO_2$ is produced that is added to the carbon dioxide that is to be purified and water.

The $CO_2$ flow that contains water is separated at 37° C. under 7 bar absolute.

The $N_2/CO_2$ separation from the effluent is carried out by cryogenic distillation. It is not necessary to carry out a perfect $N_2/CO_2$ separation.

The recovered nitrogen contains 6% by mole of $CO_2$ and can be used as a high-quality inert gas. The residual pressure of 7 bar of the $N_2/CO_2$ stream is enough to implement a self-refrigerated conventional cryogenic system that makes it possible to separate from the gaseous phase a $CO_2$ liquid phase that is denitrogenated to the desired purity.

The $N_2/CO_2$ separation is inexpensive relative to the $N_2/O_2$ separation from the air in Example 1.

The preceding examples can be repeated with similar success by substituting the generically or specifically described reactants and/or operating conditions of this invention for those used in the preceding examples. Also, the preceding specific embodiments are to be construed as merely illustrative, and not limitative of the remainder of the disclosure in any way whatsoever.

The entire disclosure of all applications, patents and publications, cited above and below, and of corresponding French application 00/05.425, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for purification of a G/L two-phase effluent containing carbon dioxide and gaseous and liquid hydrocarbons obtained from at least one hydrocarbon production well utilizing an injection of carbon dioxide into a formation, said process comprising:

a) separating said G/L effluent in at least one main gas-liquid separator (3), to separate $C_3^+$ hydrocarbons (5) from a gaseous effluent (10) containing a major portion of carbon dioxide ($CO_2$) and a minor portion of methane and ethane, b) subjecting said gaseous effluent to pressurized combustion (13) in the presence of oxygen in a combustion reactor, and recovering a combustion effluent (21) containing carbon dioxide, water vapor, and nitrogen, c) cooling (11/22) said combustion effluent (21), d) separating the nitrogen at least in part from the cooled combustion effluent; and e) recycling the pressurized, cooled combustion effluent into an injection well.

2. A process according to claim 1, wherein a temperature increase of the combustion effluent, due to the exothermicity of the combustion reaction, is controlled by indirect heat exchange between the combustion effluent and a coolant (30) to recover the heat of combustion.

3. A process according to claim 1, further comprising, after stage c), cooling the combustion effluent and separating the resultant condensed water from the combustion effluent in an $H_2O/CO_2$ separator (24).

4. A process according to claim 1, wherein the combustion of the gaseous effluent is carried out in the presence of a catalyst.

5. A process according to claim 3, wherein the G/L effluent from the production well contains hydrogen sulfide, the separation stage of the water in the separator comprises a sulfur dioxide ($SO_2$) scrubbing stage to remove $SO_2$ resulting from the combustion of hydrogen sulfide in the combustion reactor, and an effluent that contains water and at least the major portion of $SO_2$ is recovered from said scrubbing stage.

6. A process according to claim 5, wherein the $SO_2$ scrubbing stage comprises a direct contact of the combustion effluent with water.

7. A process according to claim 3, further comprising cooling at least a portion of the separated condensed water and recycling the cooled water to the $H_2O/CO_2$ separator.

8. A process according to claim 1, wherein separation of said G/L effluent comprises introducing G/L effluent from the production well into gas-liquid separator (3), recovering a first fraction (5) containing the $C_3^+$ liquid hydrocarbons at the bottom of said separator (3), and recovering a second fraction (4) containing carbon dioxide and a minor portion of hydrocarbons from the top of said separator (3); compressing (6) said second fraction, and introducing the compressed second fraction into a secondary gas-liquid separator (8) wherein said gaseous effluent (10) is separated from remaining $C_3^+$ hydrocarbons (9).

9. A process according to claim 1, further comprising reheating said gaseous effluent (10) by indirect heat exchange (11) with effluent (21) from the combustion reaction (13) before said gaseous effluent is subjected combustion reaction.

10. A process according to claim 1, further comprising introducing fuel into the combustion reactor at a rate sufficient to maintain a substantially constant temperature level in the combustion reactor.

11. A process according to claim 1, wherein the separation of the nitrogen from the combustion effluent is carried out by cryogenic distillation.

* * * * *

UNITED STATES PATENT AND TRADEMARK OFFICE
CERTIFICATE OF CORRECTION

PATENT NO. : 6,505,683 B2
DATED : January 14, 2003
INVENTOR(S) : Ari Minkkinen et al.

It is certified that error appears in the above-identified patent and that said Letters Patent is hereby corrected as shown below:

Title page,
Item [54], Title, reads "COMBINATION" should read -- COMBUSTION --

Column 8,
Line 39, reads "introducing G/L effluent" should read -- introducing said G/L effluent --
Line 53, reads "is subjected combustion" should read -- is subjected to said combustion --

Signed and Sealed this

Twenty-fifth Day of May, 2004

JON W. DUDAS
*Acting Director of the United States Patent and Trademark Office*